United States Patent
Guldenfels et al.

(10) Patent No.: US 8,776,989 B2
(45) Date of Patent: Jul. 15, 2014

(54) MODULAR BELT SPROCKET FOR EASY CLEANING

(75) Inventors: Dieter Guldenfels, Pfeffingen (CH); Marco Lucchi, Munchestein (CH)

(73) Assignee: Habasit AG, Reinach (CH)

( * ) Notice: Subject to any disclaimer, the term of this patent is extended or adjusted under 35 U.S.C. 154(b) by 225 days.

(21) Appl. No.: 12/947,583

(22) Filed: Nov. 16, 2010

(65) Prior Publication Data

US 2011/0094856 A1    Apr. 28, 2011

Related U.S. Application Data

(63) Continuation-in-part of application No. 12/288,602, filed on Oct. 22, 2008, which is a continuation-in-part of application No. 11/672,568, filed on Feb. 8, 2007.

(51) Int. Cl.
*B65G 45/00* (2006.01)

(52) U.S. Cl.
USPC .............................. 198/495; 198/845; 474/92

(58) Field of Classification Search
USPC .............. 198/495, 845; 134/122 R, 124, 131; 474/92
See application file for complete search history.

(56) References Cited

U.S. PATENT DOCUMENTS

| | | |
|---|---|---|
| 1,668,778 A | 5/1928 | Menningen |
| 1,922,357 A | 8/1933 | Divney et al. |
| 1,934,819 A | 11/1933 | Rorabeck |
| 3,016,235 A | 1/1962 | Cnudde |
| 3,017,986 A | 1/1962 | Ackles |
| 3,031,895 A | 5/1962 | Kindig |
| 4,218,932 A | 8/1980 | McComber |
| 4,425,007 A * | 1/1984 | Soeteber ...................... 305/111 |
| 4,816,010 A | 3/1989 | Reynolds |
| 6,223,905 B1 | 5/2001 | Buisman et al. |
| 6,367,613 B1 | 4/2002 | Montgomery |
| 6,516,944 B2 | 2/2003 | Guldenfels |
| 6,532,923 B2 | 3/2003 | Woodward et al. |
| 6,666,786 B2 | 12/2003 | Yahata |
| 6,740,172 B1 | 5/2004 | Griffiths et al. |
| 6,766,899 B1 | 7/2004 | Guldenfels |
| RE38,607 E | 10/2004 | Guldenfels et al. |
| 6,978,880 B2 | 12/2005 | Barrett |
| 7,055,675 B2 | 6/2006 | Behymer et al. |
| 7,111,724 B2 | 9/2006 | Donnenhoffer |
| 7,147,099 B2 | 12/2006 | Guernsey et al. |
| 7,225,915 B2 | 6/2007 | Kelly et al. |
| 7,370,749 B2 | 5/2008 | Smith |
| 7,407,051 B1 | 8/2008 | Farris et al. |
| 2004/0222072 A1 | 11/2004 | Verdigets et al. |
| 2007/0084699 A1 | 4/2007 | Smith |

FOREIGN PATENT DOCUMENTS

WO    2008/006232 A1    1/2008

* cited by examiner

*Primary Examiner* — Douglas Hess
(74) *Attorney, Agent, or Firm* — Hodgson Russ LLP

(57) ABSTRACT

A sprocket for engaging a modular belt having a plurality of belt modules with intercalated link ends connected by transverse pivot members to form hinges. The belt modules may have transverse ribs. The sprocket may be driven by a shaft. The sprocket may be an idler sprocket. The sprocket has a central opening for receiving the shaft. The body has a plurality of teeth disposed in pairs along a periphery of the body. The body has a first opening formed between adjacent pairs of teeth and extending toward the center of the sprocket to provide access to the hinge area, when the belt engages with the sprocket, for application of cleaning fluid.

17 Claims, 14 Drawing Sheets

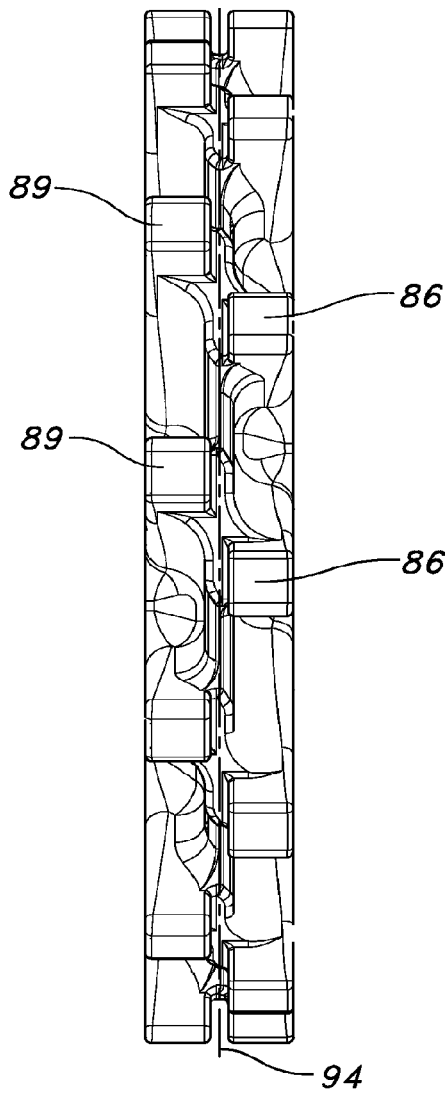
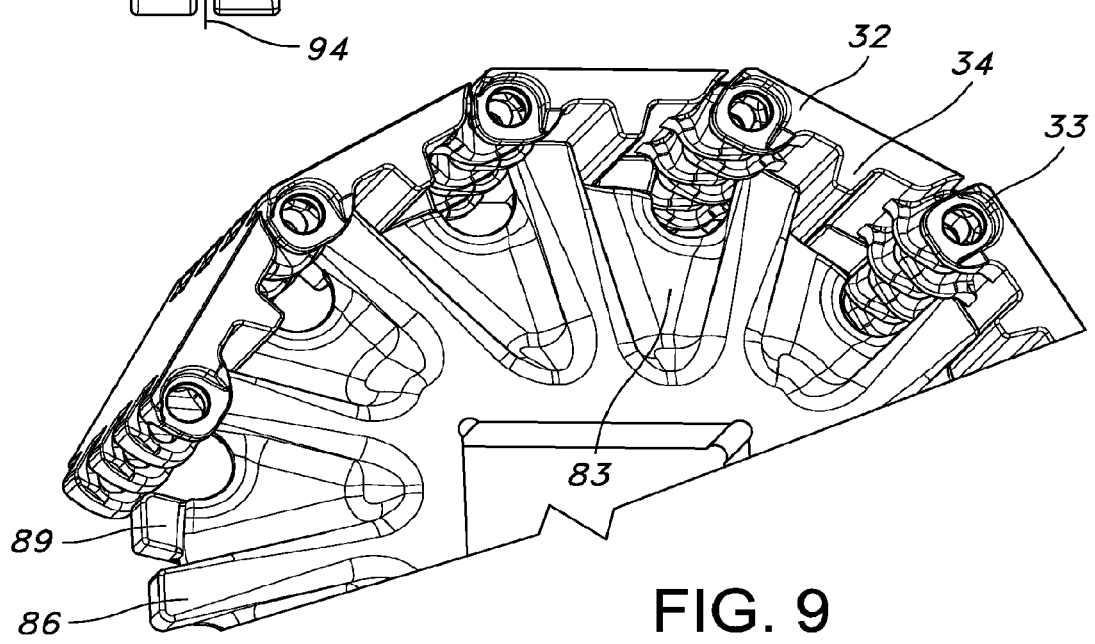
FIG. 8
FIG. 9

US 8,776,989 B2

MODULAR BELT SPROCKET FOR EASY CLEANING

CROSS-REFERENCE TO RELATED APPLICATIONS

The present application is a continuation-in-part of U.S. patent application Ser. No. 12/288,602, filed on Oct. 22, 2008, which is a continuation-in-part of U.S. patent application Ser. No. 11/672,568, filed on Feb. 8, 2007, the disclosures of which are incorporated herein by reference.

FIELD OF THE INVENTION

The present invention relates to modular conveying apparatus.

BACKGROUND OF THE INVENTION

Sprockets for engaging modular belts are usually made from stainless steel or plastic that is machined or molded. In food processing applications, sprockets are a particularly critical area for cleaning. It is important to be able to periodically remove the residual matters totally from the sprockets and on the rear side of the belt, in order to avoid bacteria growth and spoilage of the food processed on the belt. For this purpose sprockets have been designed with large openings to allow cleaning fluid to pass from the side and reach the critical areas to be cleaned. Such sprockets are disclosed in U.S. Pat. No. Re. 38,607. Typically, the sprocket rim and teeth are covering the hinges and hinder the fluid from reaching the hinge area for proper cleaning. Therefore the sprocket disclosed in the patent further provides pairs of teeth in a double row such that the teeth of a pair are offset. This arrangement allows better cleaning access to the rear belt side and easier release of residual matters collected on the rear belt side. But this design only partially solves the problem since the critical hinge areas are still covered by the sprocket rim to a certain extent, when engaged on the sprocket. Therefore good access to these hinges is of primary importance.

U.S. Patent Publication No. 2004/0222072 proposes to solve this problem by using a sprocket with an oblique shape as illustrated in FIGS. 3A, 3B of the publication. With this design, the teeth will laterally change their position on the rear side of the belt and regularly expose another place on the belt for better cleaning access. Although this is improving cleanability, the proposed solution is still having the shortcoming of periodically covering the hinge completely in a certain position. Another typical feature of the disclosed sprocket is the tracking on the belt by additional teeth engaging in the hinge gaps (FIG. 3B, reference no. 74). During sprocket engagement these teeth enter into the hinge gap between two links and thus push residual matter into this gap, making it again difficult to clean. Also, the drive pockets (reference 72 as shown in FIG. 3A of the publication) of the sprocket are engaging closely over the drive faces which are identical with the center cross bar on the rear side of the belt. The drive surfaces totally covered by the enclosing drive pocket are another place where residuals are physically squeezed in between thus making cleaning more difficult.

Another patent proposing a similar solution is U.S. Pat. No. 6,740,172. The patent does not disclose the drive engagement but discloses sectional sprockets used to laterally shift the engagement area periodically. Accordingly, there is a need for an improved sprocket for easy cleaning that avoids the above described shortcomings.

SUMMARY OF THE INVENTION

The present invention meets the above described need by providing a sprocket for engaging a modular belt having a plurality of belt modules with intercalated link ends connected by transverse pivot members to form hinges. The belt modules may have transverse ribs. The sprocket is attached to a shaft. The sprocket has a central opening for receiving the shaft. The body has a plurality of teeth disposed in pairs along a periphery of the body. The body has a first opening formed between adjacent pairs of teeth and extending toward the center of the sprocket to provide access to the hinge area, when the belt engages with the sprocket, for application of cleaning fluid.

The sprocket may also be provided with a curved recessed portion adjacent to the first opening. A plurality of second openings may be disposed in the body of the sprocket between the central opening and the first opening.

The pairs of teeth may be arranged in offset fashion with respect to a central axis or the teeth may extend for the entire with of the sprocket.

A cleaning system may be arranged proximate to the sprockets such that cleaning fluids are sprayed through the curved recessed portion into the opening disposed adjacent to the hinge of the belt when the belt engages with the sprocket. The cleaning system may include a manifold in combination with spray nozzles pointed toward the sprocket.

BRIEF DESCRIPTION OF THE DRAWINGS

The invention is illustrated in the drawings in which like reference characters designate the same or similar parts throughout the figures of which:

FIG. 8 is an end elevational view of the sprocket shown in FIG. 7;

FIG. 9 is a perspective view of the sprocket shown in FIG. 7 with a belt engaged thereon;

DETAILED DESCRIPTION OF THE INVENTION

Figure 1:
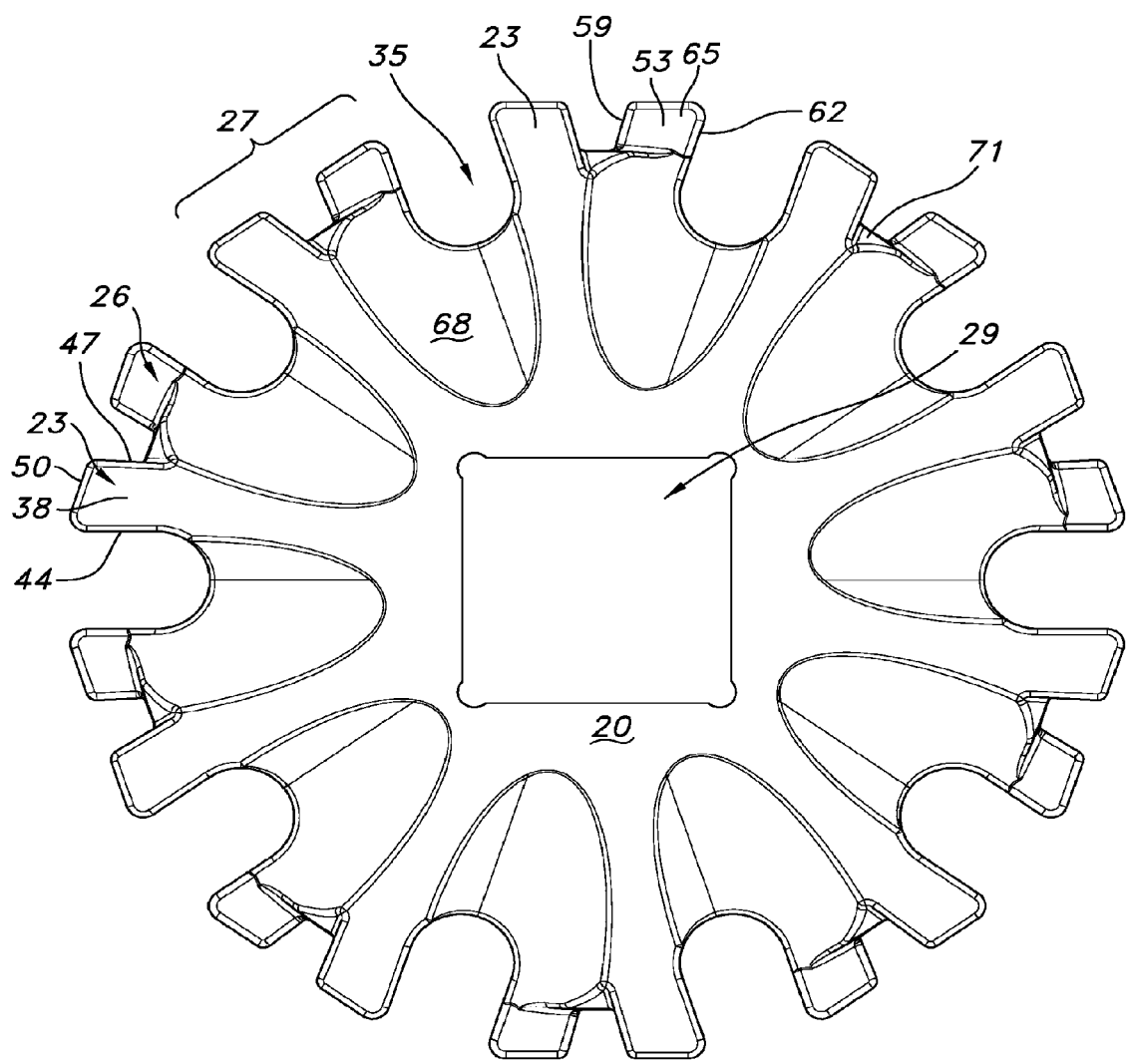
FIG. 1 is a side elevational view of a sprocket according to a first embodiment of the present invention.
Figure 3:
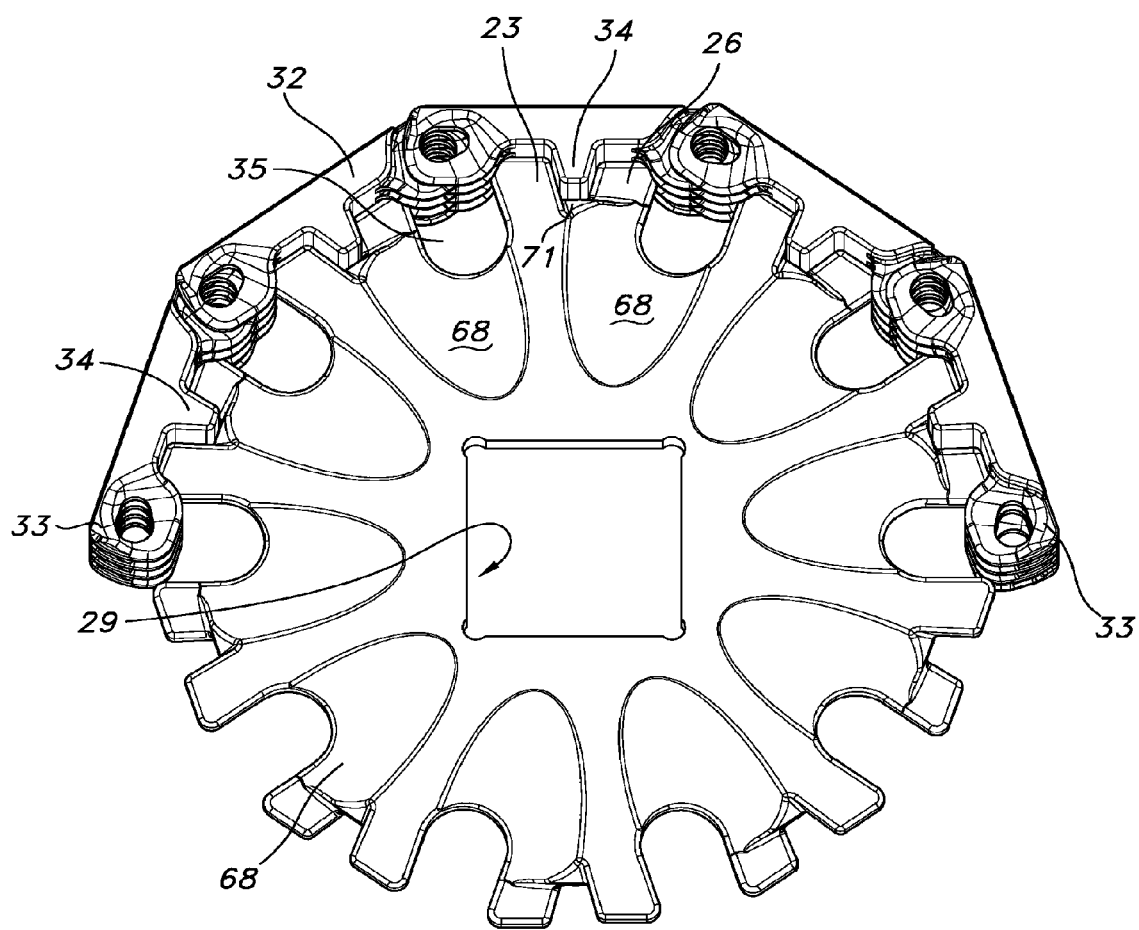
FIG. 3 is a side elevational view of the sprocket shown in FIG. 1 with a modular belt engaged thereon.

Referring initially to FIG. 1, a sprocket 20 has a plurality of sprocket teeth 23, 26 disposed in pairs 27 around the periphery of the sprocket 20. The sprocket 20 also has a central opening 29. The central opening 29 may be formed in the shape of a square. The square shaped opening 29 is sized to receive a square shaft 30 (FIG. 14) for rotating the sprocket 20 to drive a modular belt 32 (FIG. 3) when the sprocket 20 is a drive sprocket. The sprocket 20 may also be configured as an idler sprocket. The central opening 29 may be formed in other shapes to accommodate different shaft geometries as will be evident to those of ordinary skill in the art based on this disclosure. A large first opening 35 which may be oval-shaped as shown is formed in the body of the sprocket 20. The first opening 35 is located between adjacent pairs 27 of teeth and is arranged such that it aligns with the hinge area of the module belt 32 when the belt 32 is engaged with the sprocket 20 as best shown in FIG. 3. As shown the teeth 23 are formed by a pair of side walls 38, 41 (opposite to wall 38); a pair of end walls 44, 47; and a top wall 50. The teeth 26 are formed by a pair of side walls 53, 56 (opposite to wall 53); a pair of end walls 59, 62; and a top wall 65. The top walls 50 and 65 are angled relative to their respective side walls such that the top walls 50 and 65 are disposed in spaced apart relation and somewhat aligned with respect to their planar top surfaces. The sprocket 20 also has recessed curved portions 68 extending from the end of the first openings 35 toward the center of the sprocket 20. The curved recessed portions 68 extend toward the teeth 23, 26 and terminate at a shelf-like portion 71 between the respective teeth.

Figure 2:
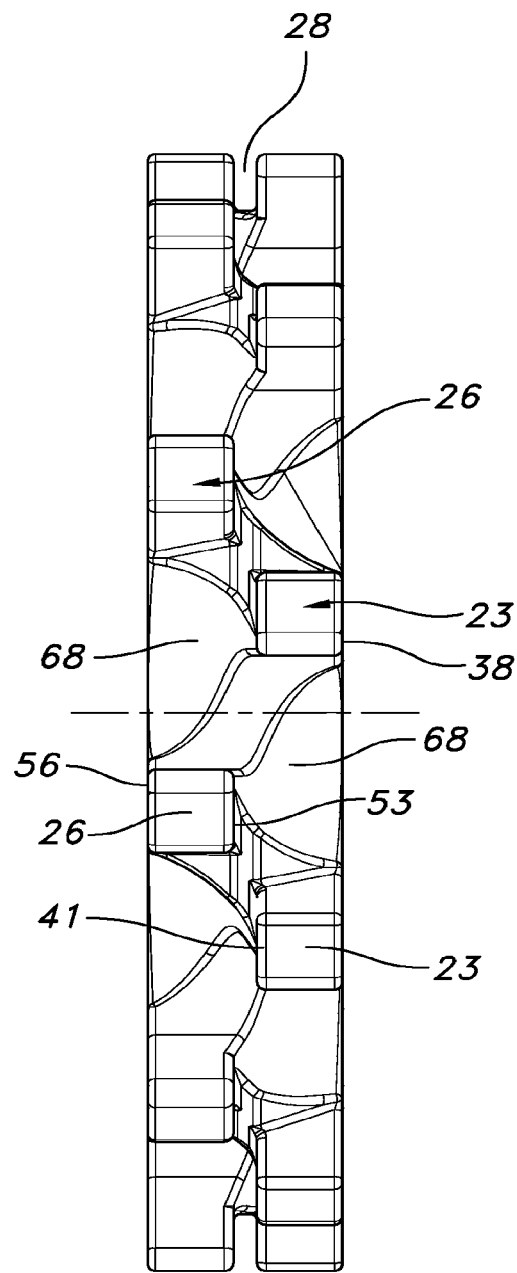
FIG. 2 is an end elevational view of the sprocket shown in FIG. 1.

Turning to FIG. 2, the teeth 23, 26 are disposed in two rows along the periphery of the sprocket 20. The teeth 23, 26 are offset along the circumference of the sprocket and are disposed on opposite sides of a central axis 28 such that when engaging a modular belt 32 one of the teeth engages with one of the link ends 33 of the belt 32 and another tooth engages with the transverse rib 34 on the belt 32. The shelf portion 71 extends between adjacent teeth 23, 26 and is bordered on opposite sides by the curved recessed portions 68.

Turning to FIG. 3, the sprocket 20 is shown engaged with the modular belt 32. The teeth 23, 26 engage with the link ends 33 and transverse rib 34 of the respective belt modules 36. The teeth 23, 26 fit on opposite sides of the transverse rib 34 and provide tracking for the belt 32. Also, the first openings 35 provide large openings and improved access to the hinge areas for cleaning when the belt 32 passes over the sprocket 20. The curved recessed portions 68 also provide room near the hinge and guide the cleaning fluid into the critical hinge area.

Figure 4:
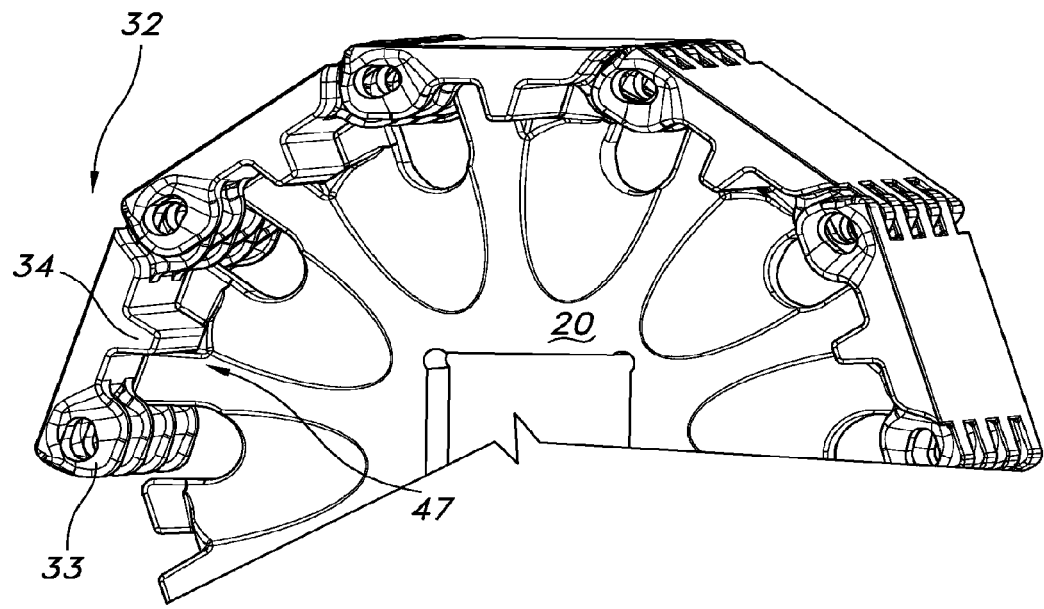
FIG. 4 is a perspective view thereof.
Figure 5:
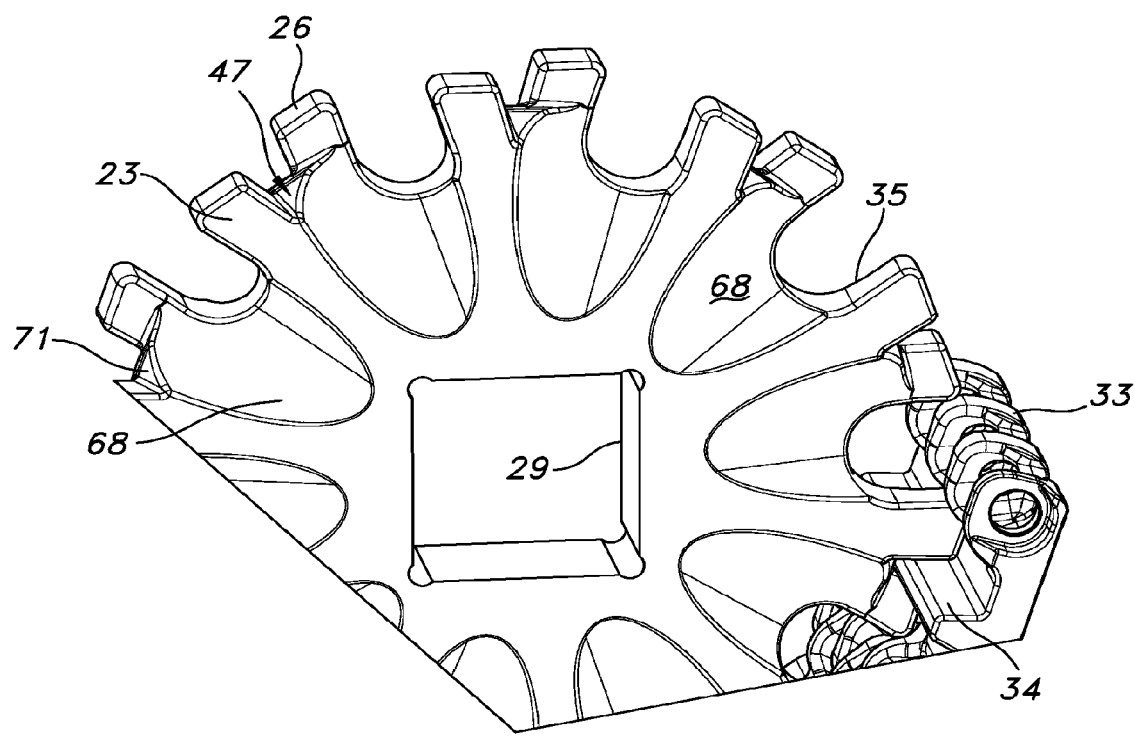
FIG. 5 is another perspective view thereof.

Turning to FIGS. 4 and 5, the end wall 47 of the tooth 23 may be disposed at an angle such that the face of the tooth 23 reduces the contact surface to the belt 32 and "squeezes" away residuals that may become trapped between the belt 32 and the sprocket 20.

Figure 6:
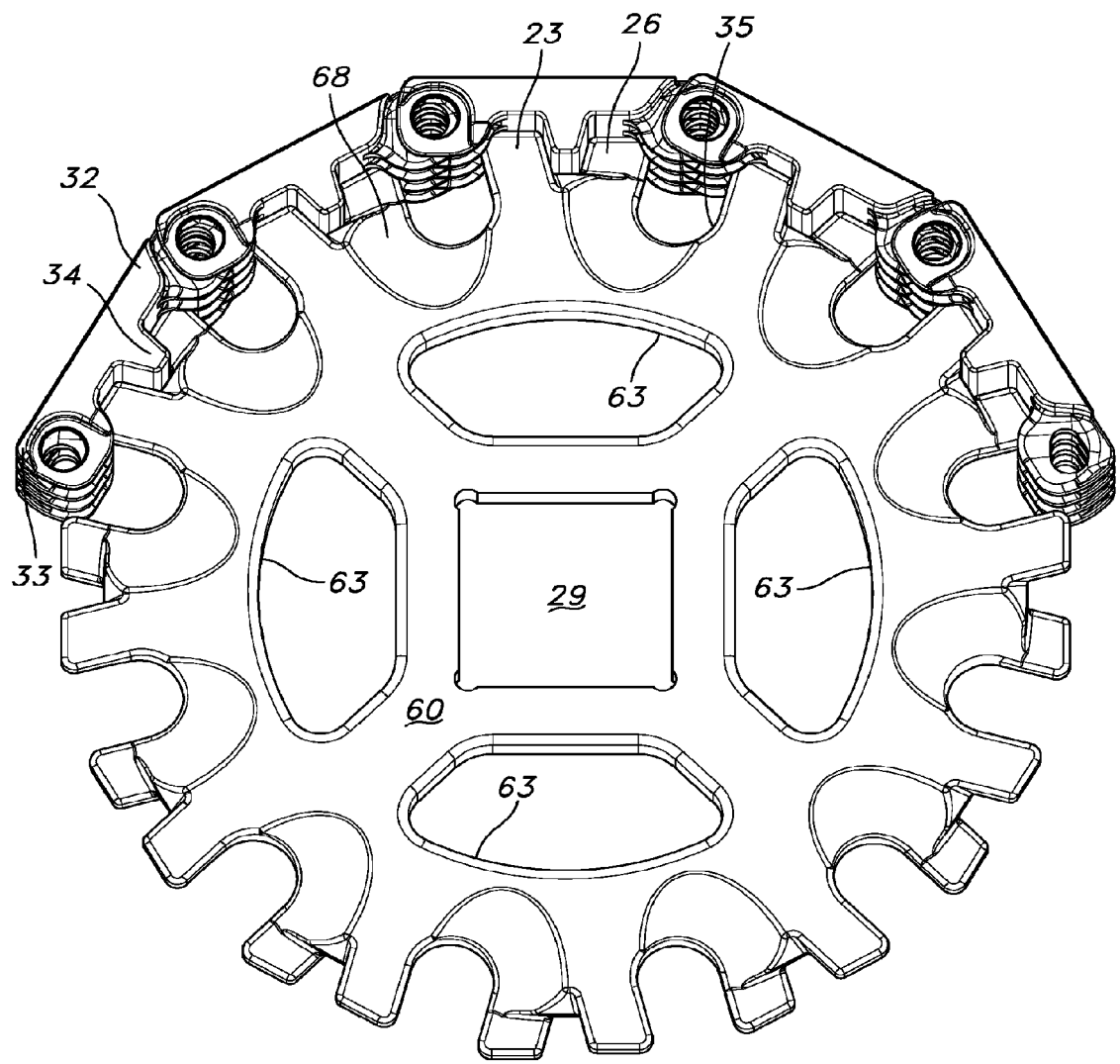
FIG. 6 is an alternate embodiment of the sprocket of the present invention.

In FIG. 6, an alternate embodiment of the sprocket 20 is shown. Sprocket 60 has the same design for the teeth 23, 26 and the first openings 35 and curved, recessed portions 68 but also includes openings 63 which are relatively large and are positioned around the periphery of the central shaft opening. The openings 63 may be desired to improve the accessibility for water jets applied from the sides of the sprocket 60. This alternate design does not necessarily improve the cleaning of the hinge areas.

Figure 7:
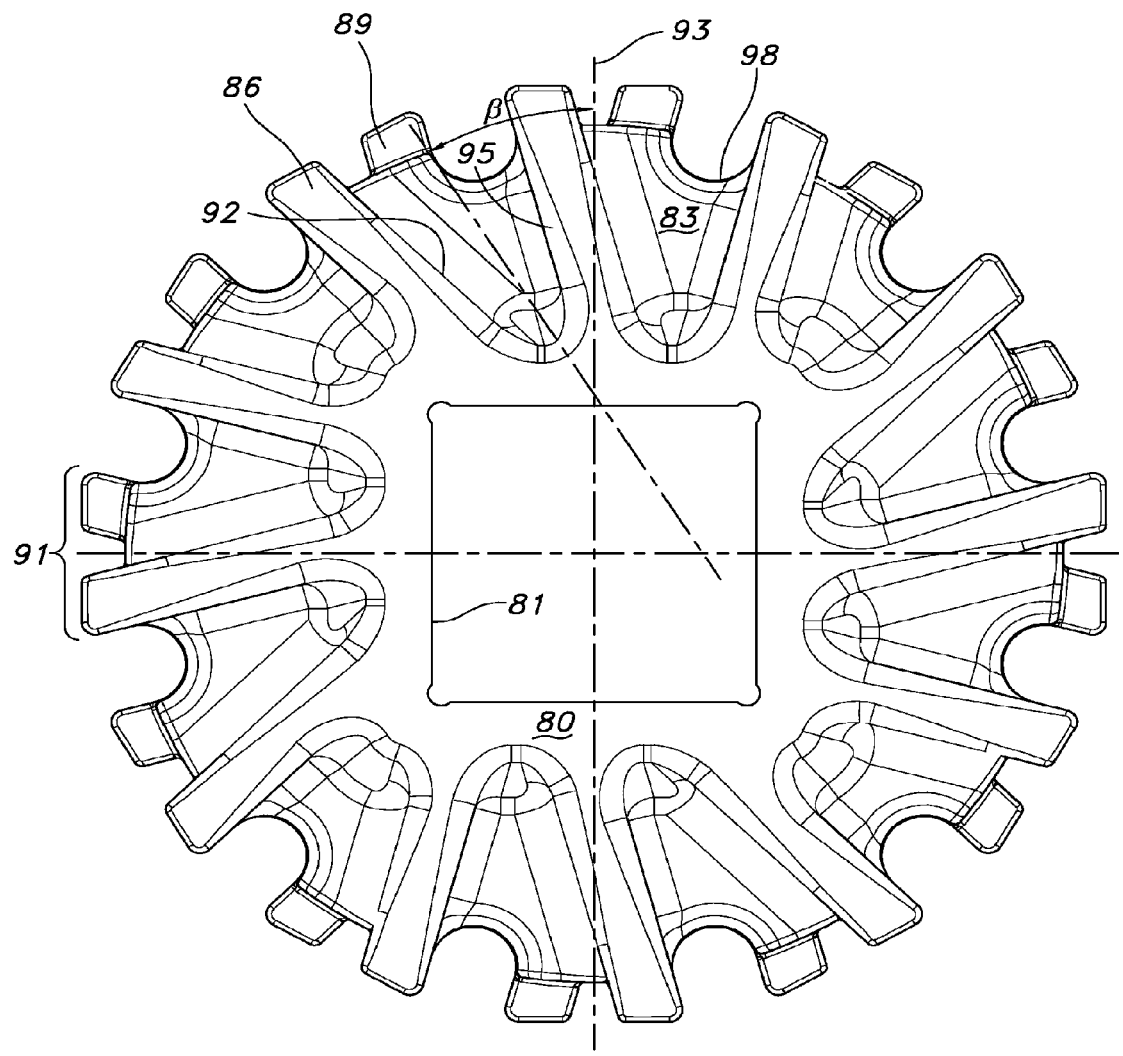
FIG. 7 is a side elevational view of another alternate embodiment of the present invention.
Figure 10:
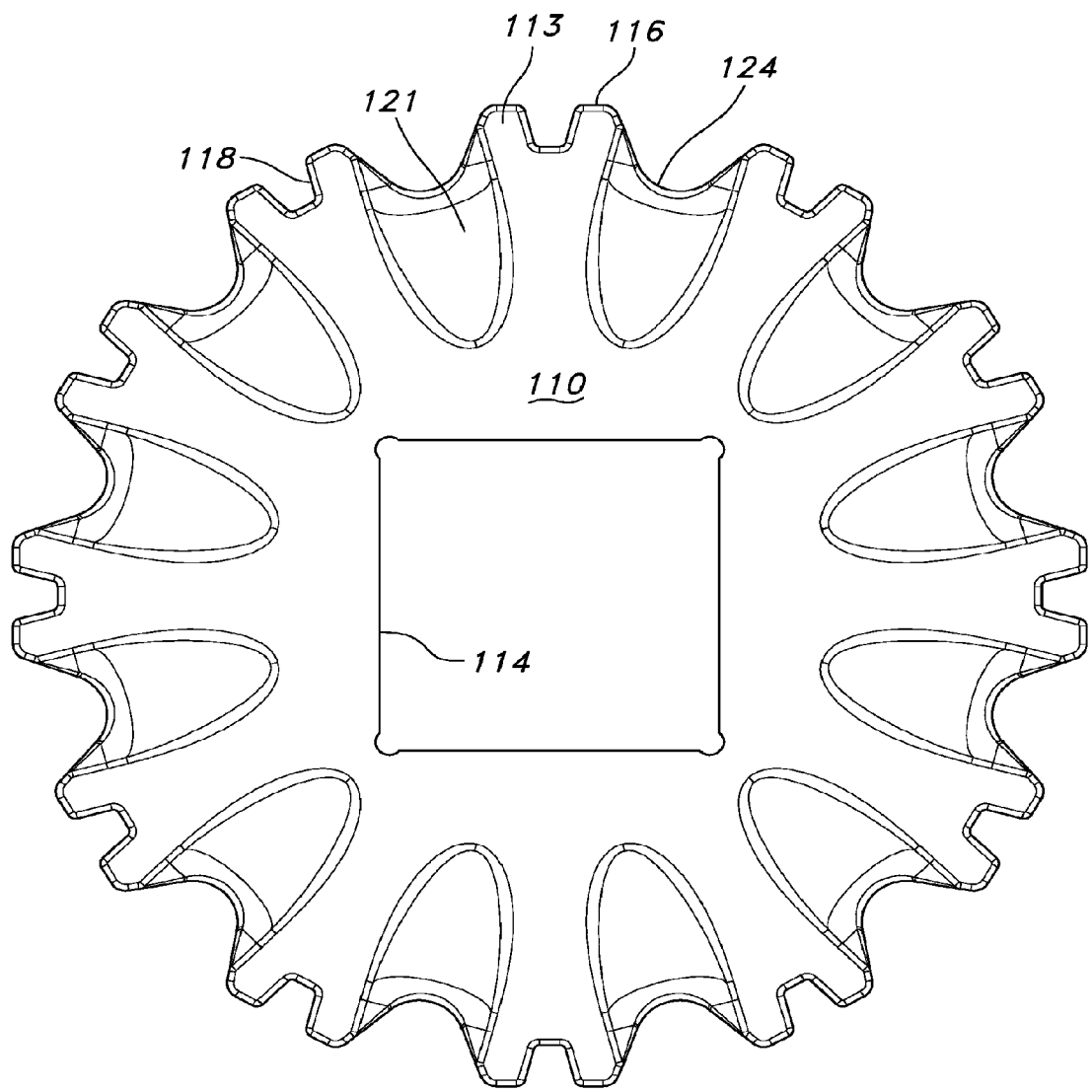
FIG. 10 is a side elevational view of another alternate embodiment of the present invention.

Turning to FIGS. 7-9, an alternate embodiment of the sprocket body that is particularly suitable for molding is shown. Sprocket 80 has a central opening 81 and has larger curved, recessed portions 83 that follow the offset (with respect to the circumference as best shown in FIG. 8) arrangement of the sprocket teeth pairs 86, 89. The teeth are disposed in pairs 91 with each tooth on opposite sides of a central axis 94. The curved recessed portion 83 extends from the end wall 92 of one tooth 86 to the end wall 95 of the next tooth 86 on the same side of the sprocket 80. A first opening 98 formed between adjacent teeth 86, 89 provides an opening around the hinge area. The pairs 91 of sprocket teeth 86, 89 provide for engagement of the transverse rib 34 and link end 33 of belt 32 as shown in FIG. 9. The recessed portion 83 is disposed at an angle β with respect to the radial axis 93. The angle β may be altered as necessary to improve the flow of cleaning fluid.

Figure 11:
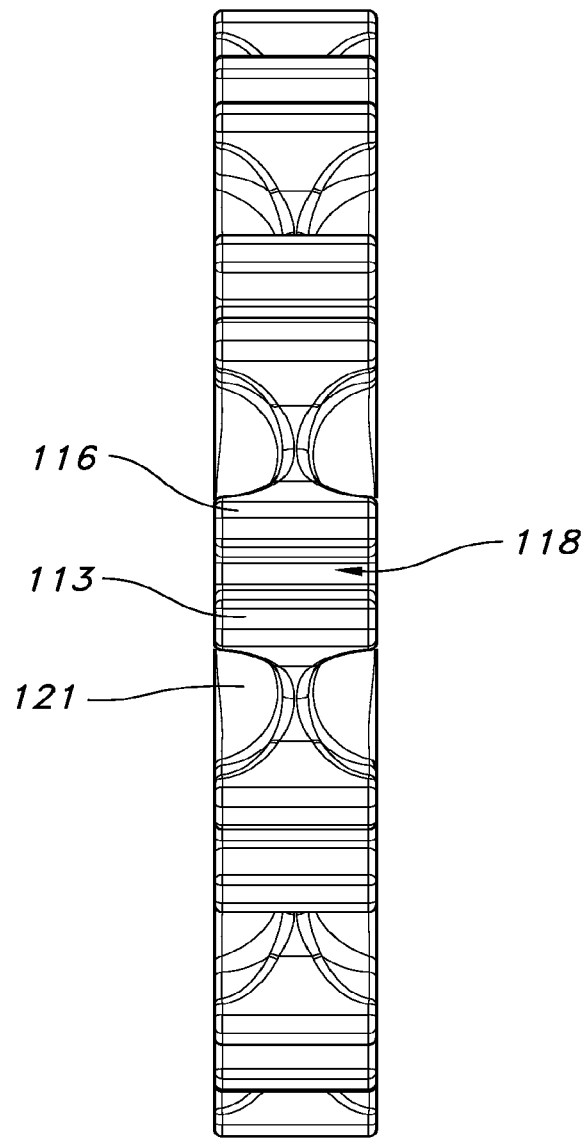
FIG. 11 is an end elevational view of the sprocket of FIG. 10.
Figure 12:
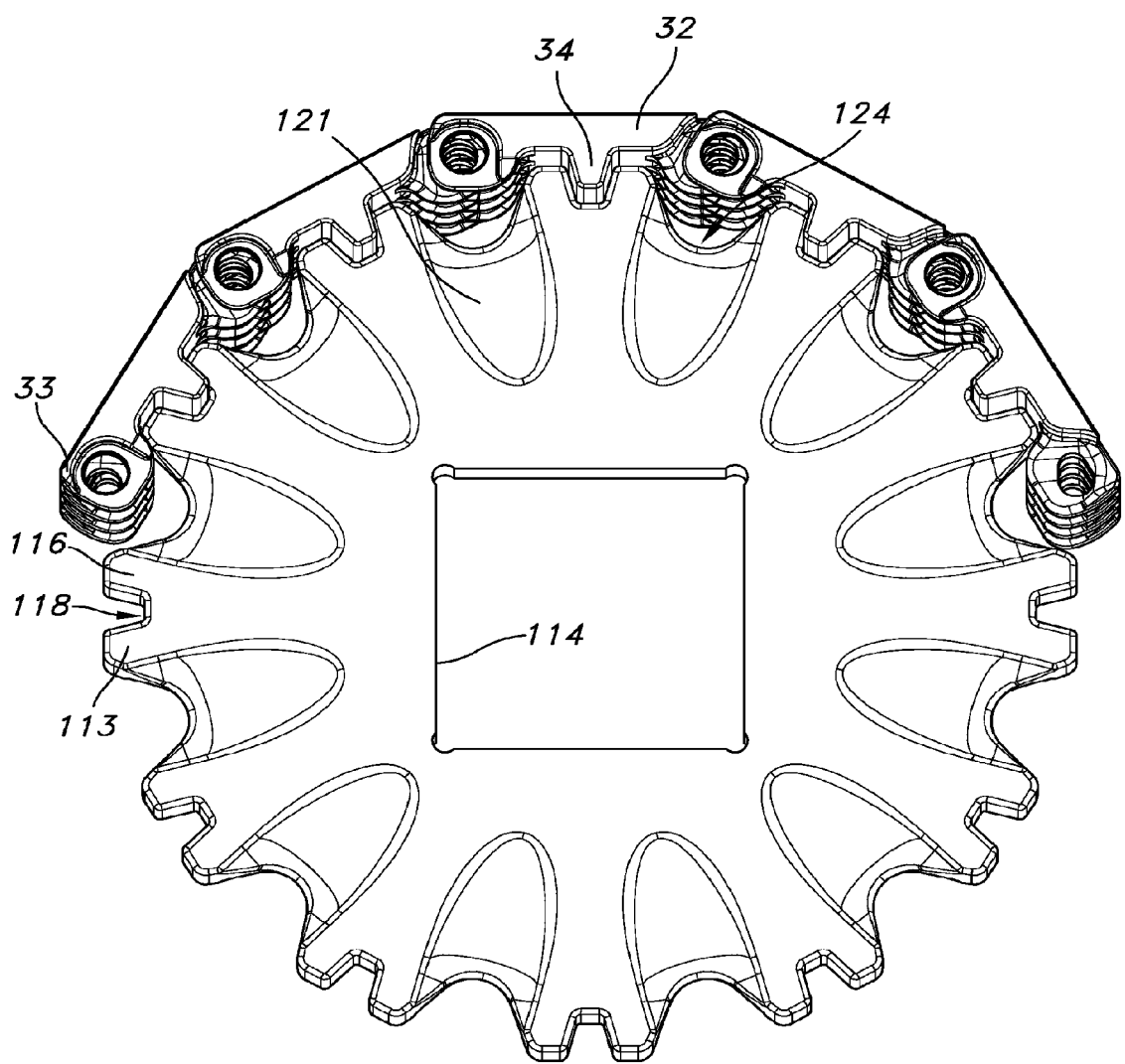
FIG. 12 is a side elevational view of the sprocket of FIG. 11 with a modular belt engaged thereon.
Figure 13:
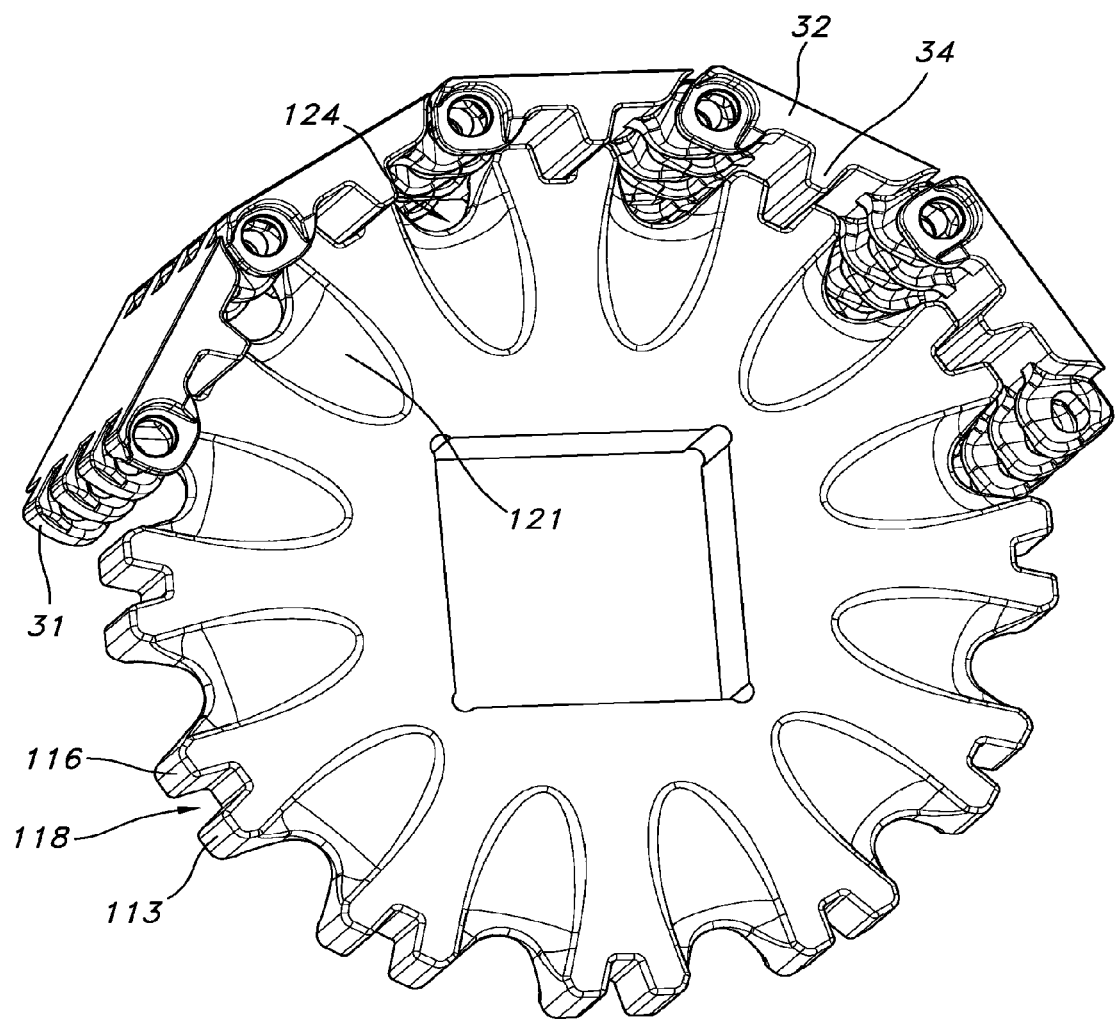
FIG. 13 is perspective view thereof.

Turning to FIGS. 10-13, an alternate embodiment of the sprocket is shown. Sprocket 110 has a central opening 114. Sprocket 110 increases the open space between the sprocket 110 and the hinge of the belt 32. The sprocket 110 may be used where tracking is not needed such as where the belt 32 is guided by guiding profiles on the edge of the belt 32. As best shown in FIG. 11, the sprocket 110 has a single row of teeth pairs 113, 116 without any offset. Due to the wider teeth 113, 116 and the closed V-shape of the space 118 between the teeth 113, 116, the sprocket 110 contact area is larger and may negatively effect the cleaning properties of the sprocket 110. The sprocket 110 also includes a curved, recessed portion 121. The recessed portion 121 extends to a first opening 124 that aligns with the hinge area of belt 32 as shown in FIG. 12.

Figure 14:
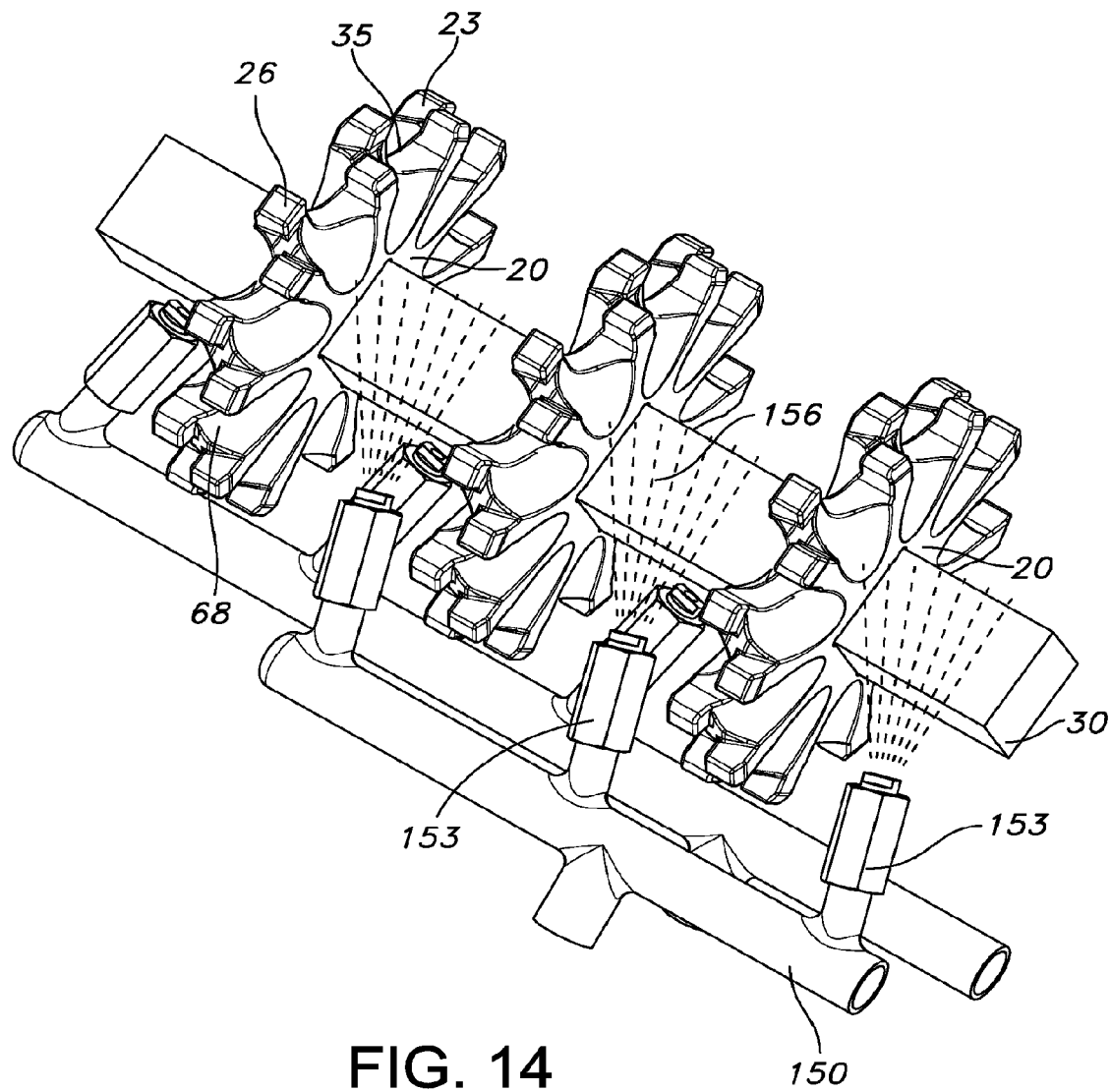
FIG. 14 is a schematic view of sprockets of the present invention in combination with a spraying system.

FIG. 14 illustrates an arrangement of a spraying system include a manifold 150 with spray nozzles 153 arranged adjacent to sprockets 20 such that cleaning fluid 156 can be sprayed through the curved recessed portions 68 into the first openings 35 below the hinge areas of the modular belts 32 as they pass over the sprocket 20.

Figure 15:
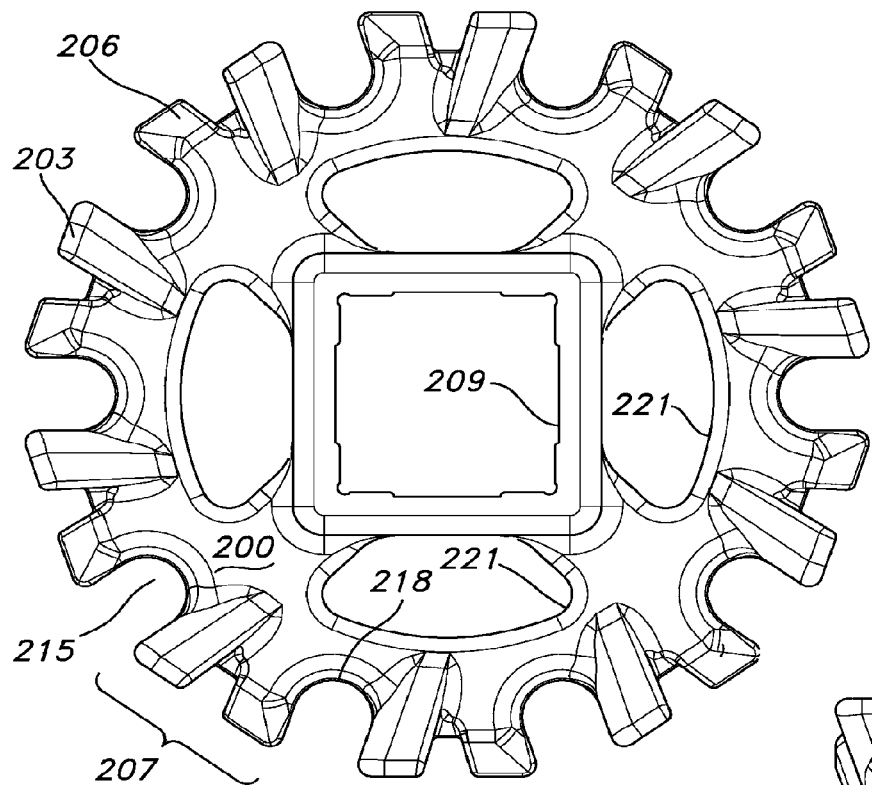
FIG. 15 is a side elevational view of another alternate embodiment of the present invention.
Figure 17:
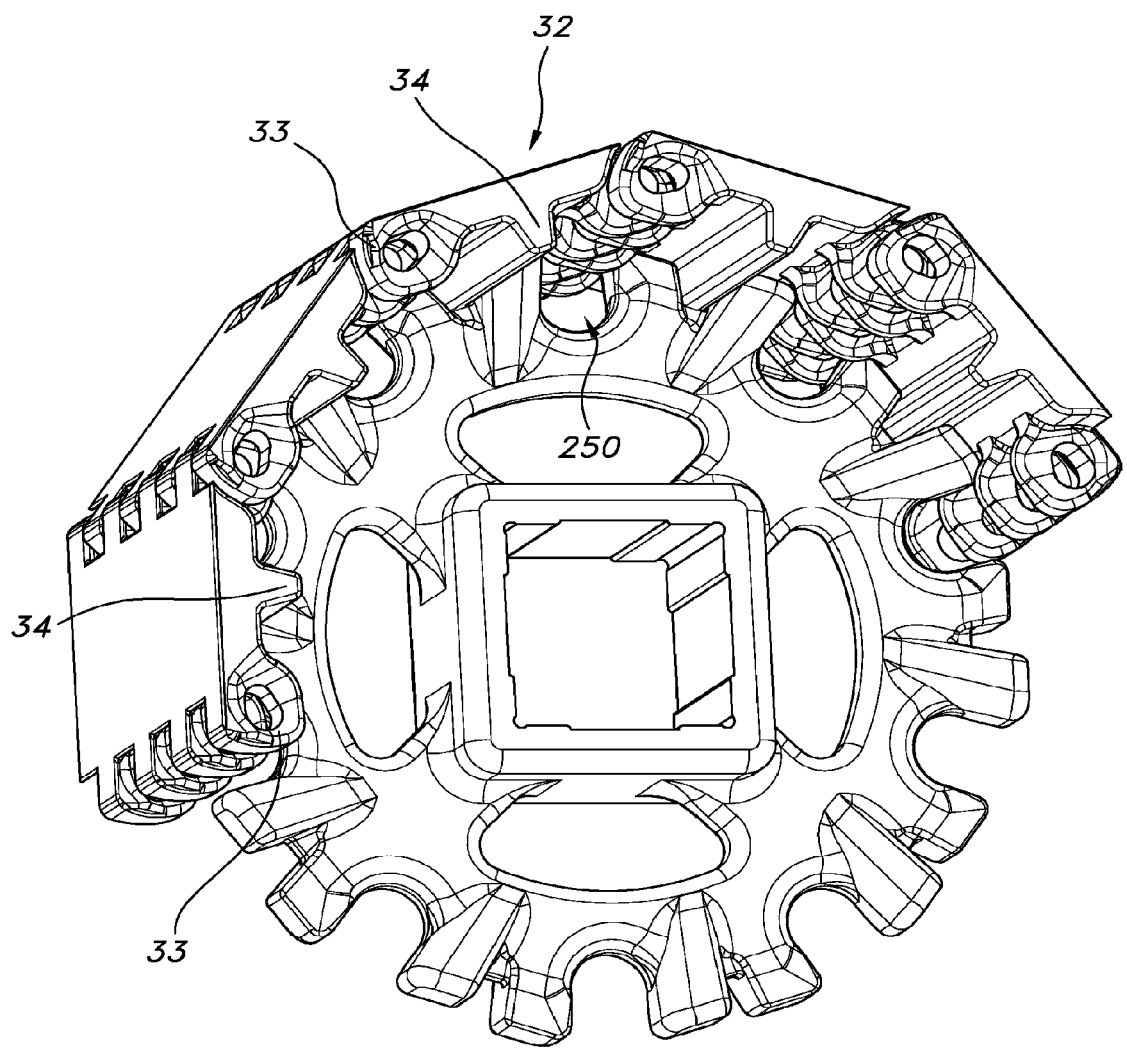
FIG. 17 is a perspective view of the sprocket of FIG. 15 with a belt engaged thereon.

Turning to FIG. 15, another embodiment of the sprocket is shown. A sprocket 200 has a plurality of sprocket teeth 203, 206 disposed in pairs 207 around the periphery of the sprocket 200. The sprocket 200 also has a central opening 209 that is formed in the shape of a square. The square shaped opening 209 is sized to receive a square shaft 30 (FIG. 14) for rotating the sprocket 200 to drive a modular belt 32 as shown in FIG. 17, when the sprocket 200 is a drive sprocket. The sprocket 200 may also be configured as an idler sprocket. A plurality of first openings 215 are disposed around the periphery of the sprocket 200 between the pairs 207. The first openings 215 extend inward toward the center of the sprocket 200 and terminate along a curved inner wall 218. A plurality of second openings 221 are disposed between the first openings 215 and the central opening 209. The second openings 221 may be desired to improve the accessibility of water jets applied from the sides of the sprocket 200. Sprocket 200 does not include recessed portions or grooves below the first opening 215. The sprocket 200 is intended to have smooth surfaces with large openings to provide access to the hinge area of the belt and to allow easier cleaning of the sprocket itself.

Figure 16:
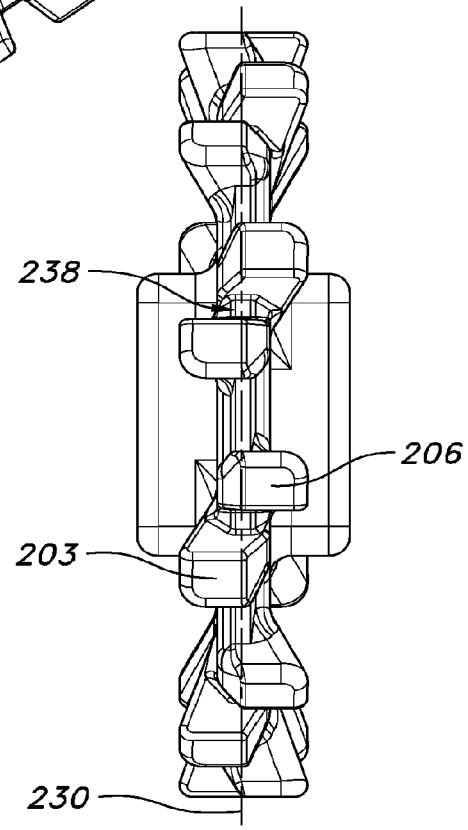
FIG. 16 is an end elevational view of the sprocket shown in FIG. 15.

In FIG. 16, the teeth 203, 206 are disposed in two rows along the periphery of the sprocket 200. The teeth 203, 206 are offset along the circumference of the sprocket 200 and are disposed on opposite sides of a central axis 230. When engaged with a modular belt 32 one of the teeth engages with one of the link ends 33 of the belt 32 and another tooth engages with the transverse rib 34 on the belt 32. The transverse rib 34 on the belt 32 fits in the space 238 between the teeth 203, 206.

Turning to FIG. 17, the sprocket 200 is shown engaged with the modular belt 32. The teeth 203, 206 engage with the link ends 33 and transverse rib 34 of the respective modules 36. The teeth 203, 206 fit on opposite sides of the transverse rib 34 and provide tracking for the belt 32. Also, the first openings 215 provide large openings and improved access to the hinge areas for cleaning when the belt 32 passes over the sprocket 200. As indicated by arrow 250 the first openings 215 align with the hinge areas of the belt 32 as the belt 32 passes over the sprocket 200.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A sprocket for engaging a modular belt having a plurality of belt modules with intercalated link ends connected by transverse pivot members to form hinges, the belt modules having transverse ribs, the sprocket comprising:
    a body having a central opening for receiving a shaft, the body having a plurality of teeth disposed in pairs along a periphery of the body, the body having at least one first opening formed between adjacent pairs of teeth, the first opening extending toward the a center of the sprocket to provide access to the hinge area, when the belt engages with the sprocket, for application of cleaning fluid, the first opening being disposed adjacent to a recessed portion, the recessed portion being curved and recessed from a first side surface of the body toward a second side surface of the body to form a concave trough configured to redirect cleaning fluid toward the hinges of the plurality of belt modules; and
    wherein the second side surface of the body is opposite the first side surface of the body and the first opening extends from the first side surface of the body to the second side surface of the body.

2. The sprocket of claim 1, wherein each pair of teeth has a space therebetween sized to receive the transverse rib of the belt module when the belt is engaged with the sprocket.

3. The sprocket of claim 1, wherein each pair of the teeth have walls that are facing and angled opposite each other.

4. The sprocket of claim 1, wherein the teeth are disposed in pairs that are offset with respect to the circumference of the sprocket.

5. The sprocket of claim 1, wherein the teeth are disposed in pairs with each tooth on opposite sides of a central axis.

6. The sprocket of claim 1, wherein the teeth are disposed in a single row extending from a first side of the sprocket to the opposite side of the sprocket.

7. The sprocket of claim 1, wherein the curved, recessed portion is oriented radially with respect to the sprocket.

8. The sprocket of claim 1, further comprising at least one opening disposed between the central opening and the at least one first opening.

9. The sprocket of claim 8, wherein the at least one opening comprises a plurality of openings disposed around the central opening.

10. A sprocket, comprising:
    a body having a central opening, the body having a plurality of teeth disposed in pairs along a periphery of the body, the body having at least one first opening formed between adjacent pairs of teeth, the first opening extending toward the center of the sprocket, the first opening being disposed adjacent to a recessed portion, the recessed portion being curved and recessed from a first side surface of the body toward a second side surface of the body to form a concave trough configured to redirect cleaning fluid toward the first opening; and
    wherein the second side surface of the body is opposite the first side surface of the body and the first opening extends from the first side surface of the body to the second side surface of the body.

11. The sprocket of claim 10, wherein each pair of teeth has a space therebetween sized to receive the transverse rib of the belt module when the belt is engaged with the sprocket.

12. The sprocket of claim 10, wherein each pair of the teeth have walls that are facing and angled opposite each other.

13. The sprocket of claim 10, wherein the teeth are disposed in pairs that are offset with respect to a central axis.

14. The sprocket of claim 10, wherein the teeth are disposed in a single row extending from a first side of the sprocket to the opposite side of the sprocket.

15. The sprocket of claim 10, wherein the curved, recessed portion is oriented radially with respect to the sprocket.

16. The sprocket of claim 10, further comprising at least one opening disposed between the central opening and the at least one first opening.

17. The sprocket of claim 16, wherein the at least one opening comprises a plurality of openings disposed around the central opening.

* * * * *